P. MacGAHAN.
ELECTRICAL MEASURING INSTRUMENT.
APPLICATION FILED OCT. 3, 1913.

1,194,203.

Patented Aug. 8, 1916.

WITNESSES:
Fred A. Lind.
J H Procter

INVENTOR
Paul MacGahan
BY
Wesley G Carr
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,194,203.  Specification of Letters Patent.  Patented Aug. 8, 1916.

Application filed October 3, 1913. Serial No. 793,082.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to graphic meters.

The object of my invention is to provide a graphic meter having a mechanically controlled operating mechanism.

Graphic meters have heretofore been provided with electrical contact terminals which controlled the operation of some form of mechanical recording device, but the contact surfaces of these devices have been subject to deterioration in service because of arcing. To relieve this source of trouble, I provide a series of mechanically actuated clutches which engage mechanism for advancing or retarding the marking mechanism of the meter.

Figure 1:
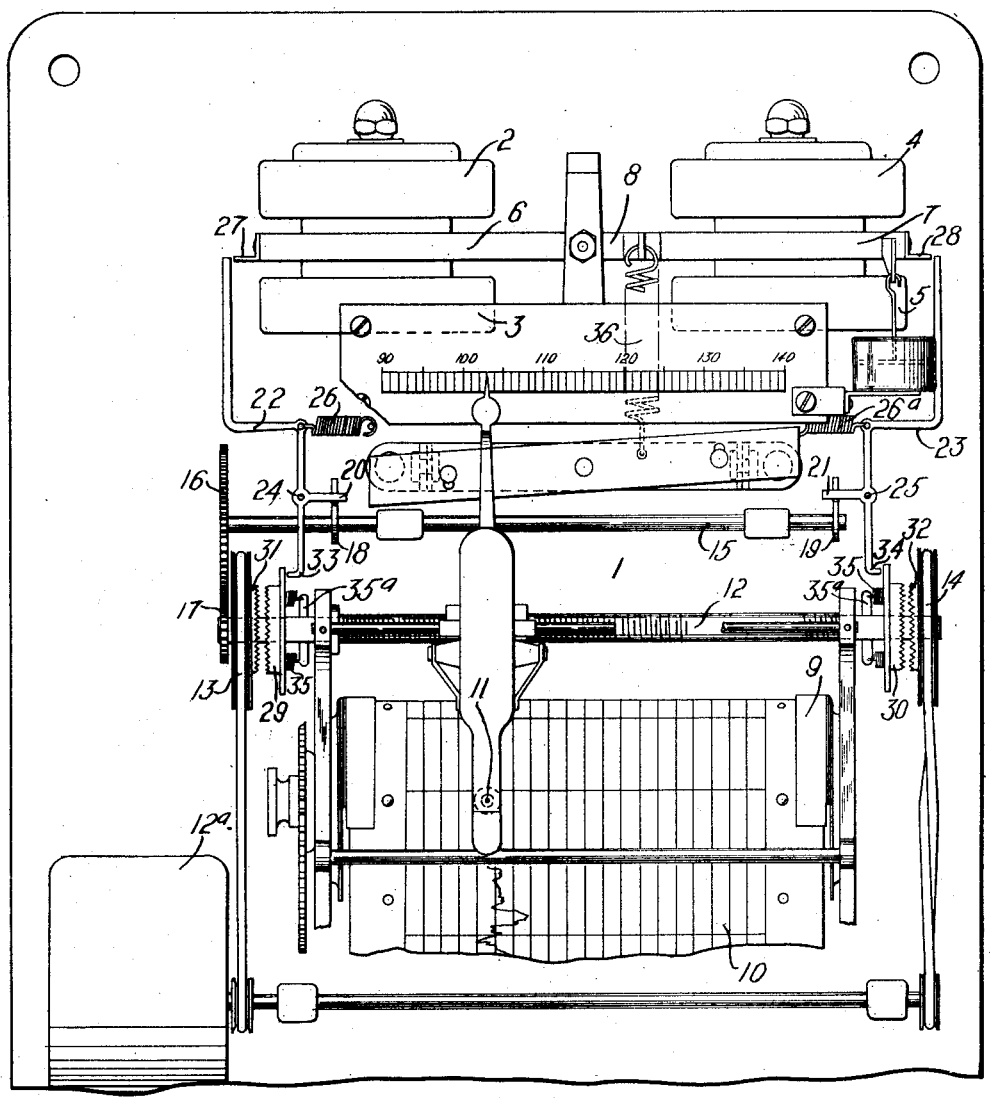
Figure 2:
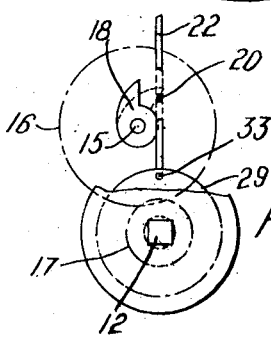

Figure 1 of the accompanying drawings is a front elevational view of a graphic meter embodying my invention, and Fig. 2 is a side elevation of a cam mechanism which is used in my invention.

My invention is embodied in a graphic wattmeter 1 having four stationary coils 2, 3, 4 and 5 and two movable coils 6 and 7 which are mounted on a pivotally mounted member 8, a drum 9, upon which is wound a record sheet 10, a pen 11, a screw shaft 12, that operates the pen 11, a motor 12$^a$ for driving two oppositely rotatable pulleys 13 and 14 that are loosely mounted on the screw shaft 12, a shaft 15 driven by a gear wheel 16 that engages a pinion 17 attached to the pulley 13, cams 18 and 19 mounted upon the shaft 15 and adapted to engage projections 20 and 21 on irregular shaped, pivotally mounted members 22 and 23. The members 22 and 23 are pivotally mounted at points 24 and 25 and are retained in predetermined positions by springs 26 and 26$^a$, which position is varied by engagement with projections 27 and 28 on the movable member 8 of the wattmeter. Rigidly fastened to the ends of the screw shaft 12 are clutch members 29 and 30 which coöperate, respectively, with clutch members 31 and 32 on the pulleys 13 and 14 to cause the screw shaft to rotate in the one or the other direction. Projections 33 and 34 on the members 22 and 23 are provided for effecting engagement of the clutch members 29 and 31, and 30 and 32, respectively. The clutch members 29 and 30 are normally held out of engagement with the members 31 and 32 by a plurality of springs 35 that are attached to projections 35$^a$ on the screw shaft 12.

The operation of a Kelvin balance wattmeter, as shown in the accompanying drawing, is well understood by those skilled in the art, and it will therefore be sufficient to say that there are two forces tending to move the pivotally mounted member 8 in opposite directions, namely, the force due to the attraction of the coils and the force due to a control spring 36. The total force due to the attraction of the coils is proportional to the current and voltage of the energy to be measured, hence, the member 8 tends to move in one direction when the energy increases and the opposite direction when it decreases. The motor 12$^a$ operates continuously at a predetermined speed, as do the pulleys 13 and 14 and the shaft 15, in order that the pen 11 may be operated at predetermined intervals.

Assuming the energy to be substantially constant, as indicated by the curve on record sheet 10, if the energy begins to increase on account of an increase of either current or voltage, the coil 6 on the pivotally mounted member 8 moves upwardly between the coils 2 and 3 to release the member 22 from the projection 27 and thus permit the spring 26 to turn it around its pivot 24 sufficiently to cause the projection 33 to force the clutch member 29 into engagement with the clutch member 31. The screw shaft 12 will then be rotated and the pen 11 will move across the paper 10 a predetermined distance that depends upon the speed of rotation of the cam shaft 15. As the cam 18 rotates, it engages the projection 20 to turn the member 22 on its pivotal point and thus permit the springs 35 to effect disengagement of the clutch members 29 and 31. When the high point of the cam 18 passes the projection 20 the member 22 will be released to permit the spring to restore it to its former position. If the energy continues to increase or has increased during the movement of the pen, the spring 26 will be free to cause the clutch members to engage. This cycle of operation continues until the energy becomes steady or begins to decrease. In case the energy decreases, the coil 6 on the pivotally mounted member 8 moves downwardly between the coils 2 and 3 and places the projection 27 in such position as to prevent the spring 26 from drawing the member 22 inwardly to effect movement of the pen 11.

As the energy decreases, the coil 7 rises between the stationary coils 4 and 5 and moves the projection above the end of the member 23, to permit the spring 26ᵃ, in coöperation with the member 23, to throw the clutch member 30 into engagement with the clutch member 32. The screw shaft is thereupon rotated in the opposite direction to that when the energy was increasing, and the pen 11 travels back across the paper 10, substantially as hereinbefore explained. The object of the cams 18 and 19 is to give the pivotally mounted element 8 unrestricted movement, at predetermined times. The springs 35 tend to hold the clutch members out of engagement so that, when the cams relieve the pressure they will be disengaged instantly. The pen will advance by steps, as determined by the cams, until a position corresponding to non-variable energy is reached, and both pivotally mounted members 22 and 23 are held so that the clutches do not operate to cause the pen to change its position. As the paper 10 is on a drum which is moved a predetermined amount each minute or second, depending upon the record desired, the pen will trace a curve representing the power measured at any time.

As shown in the accompanying drawings, there are numerous attachments such as dash pots, springs and indicating devices which are familiar to those versed in the art and, consequently, their action will not be explained here.

I desire it to be understood that changes may be made in the construction of my invention and it can be adapted to any type of electric measuring instrument without departing from the invention as set forth in the appended claims.

I claim as my invention:

1. In a graphical measuring instrument, the combination with an electrical measuring instrument of the Kelvin balance type and a recording device, of two pulleys, means for normally driving said pulleys in opposite directions, clutches disposed between the pulleys and the recording device, and non-electrical means actuated by the measuring instrument for connecting the clutches to the pulleys.

2. In an electrical measuring instrument, the combination with a recording device, of two pulleys, means for driving the said pulleys in opposite directions, means whereby the said pulleys operate said recording device, means governed by one of the said pulleys for controlling the time of operation of the said recording device, and means for mechanically controlling the operation of the said recording device.

3. In an electrical measuring instrument, the combination with a meter, of two oppositely rotating pulleys, a screw shaft upon which said pulleys are loosely mounted, a recording device operated by the said screw shaft, means for limiting the travel of the said recording device at any one time, clutches for connecting the said pulleys to the said screw shaft, and mechanical means governed by the said meter for controlling the action of the said clutches.

4. In a graphical measuring instrument, the combination with a movable meter element having projections on its ends, of pivotally mounted members, the movements of which are governed by said projections, resilient means for operating said pivotally mounted members, a screw shaft, clutch members operating loosely upon said shaft in opposite directions, means whereby said pivotally mounted members control the direction of rotation of said shaft, and means for limiting the length of time said shaft rotates continuously.

5. In a graphical measuring instrument, the combination with a movable meter element having projections on its ends, of pivotally mounted members the movements of which are governed by said projections, resilient means for operating said pivotally mounted members, a screw shaft, loosely mounted, oppositely rotatable pulleys on said shaft, clutch members attached to said pulleys and to said shaft, said pivotally mounted members being adapted to effect engagement of said clutch members, and means for limiting the length of time said shaft rotates.

6. In a measuring instrument the combination with an electrical meter of two pivotally mounted members governed by said meter, springs for operating said pivotally mounted members, means for causing said pivotally mounted members to be operated at certain times in opposition to said springs, oppositely rotatable clutch members, a screw shaft, a recording device actuated by said screw shaft, and means whereby said pivotally mounted members control the direction of rotation of said screw shaft.

7. In a measuring instrument, the combination with an electrical meter, of two pivotally mounted members governed by said meter, springs for operating said pivotally mounted members, cams which cause said pivotally mounted members to operate in opposition to said spring at definite time intervals, a screw shaft, two oppositely rotatable clutch members, two clutch members attached to said screw shaft, said pivotally mounted members serving to effect engagement of said clutch members, and a recording device operated by said screw shaft.

In testimony whereof, I have hereunto subscribed my name this 27th day of Sept., 1913.

PAUL MacGAHAN.

Witnesses:
B. B. HINES,
B. H. SMITH.

Copies of this patent may be obtained for five cents each, by addressing the "Commissioner of Patents, Washington, D. C."